(12) United States Patent
Smith et al.

(10) Patent No.: US 9,212,243 B2
(45) Date of Patent: Dec. 15, 2015

(54) SOIL ADSORPTION POLYMERS

(75) Inventors: Steven Daryl Smith, Fairfield, OH (US); Robert Joseph McChain, Cincinnati, OH (US); Robin Lynn McKiernan, Mason, OH (US); Charles William Neal, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 491 days.

(21) Appl. No.: 13/598,770

(22) Filed: Aug. 30, 2012

(65) Prior Publication Data

US 2013/0059997 A1 Mar. 7, 2013

Related U.S. Application Data

(60) Provisional application No. 61/530,058, filed on Sep. 1, 2011.

(51) Int. Cl.

| *C08F 220/60* | (2006.01) |
| *C08F 226/06* | (2006.01) |
| *C08F 228/02* | (2006.01) |
| *C08F 220/56* | (2006.01) |
| *C08F 220/00* | (2006.01) |

(52) U.S. Cl.
CPC .................. *C08F 220/00* (2013.01)

(58) Field of Classification Search
CPC ..... C08L 2666/04; C08L 33/14; C08L 33/24; C08F 220/00; C08F 220/06; C08F 220/56; C08F 220/58; C08F 220/60

USPC .............. 526/258, 287, 307, 307.6
See application file for complete search history.

(56) References Cited

U.S. PATENT DOCUMENTS

| 2,625,529 | A | | 1/1953 | Hedrick et al. | |
| 4,118,316 | A | * | 10/1978 | Talley et al. | 210/635 |
| 4,624,890 | A | | 11/1986 | Lloyd et al. | |
| 4,861,511 | A | | 8/1989 | Kaplan | |
| 6,664,218 | B1 | | 12/2003 | Dastbaz et al. | |
| 7,772,175 | B2 | | 8/2010 | Panadiker et al. | |
| 8,263,544 | B2 | | 9/2012 | Panadiker et al. | |
| 8,450,263 | B2 | | 5/2013 | Panadiker et al. | |
| 2004/0224862 | A1 | * | 11/2004 | Drovetskaya et al. | 510/119 |
| 2007/0021313 | A1 | * | 1/2007 | Hattori et al. | 510/108 |
| 2007/0293414 | A1 | * | 12/2007 | Panandiker et al. | 510/515 |
| 2010/0055643 | A1 | | 3/2010 | Hung | |
| 2010/0190679 | A1 | | 7/2010 | VanPachtenbeke et al. | |
| 2010/0240563 | A1 | | 9/2010 | Jaynes et al. | |
| 2012/0055643 | A1 | * | 3/2012 | Neal et al. | 162/164.6 |
| 2013/0055517 | A1 | | 3/2013 | Smith et al. | |
| 2013/0059766 | A1 | | 3/2013 | McKiernan et al. | |

OTHER PUBLICATIONS

U.S. Appl. No. 13/598,782, filed Aug. 30, 2012, McKiernan, et al.
U.S. Appl. No. 13/598,795, filed Aug. 30, 2012, McKiernan, et al.
All Office Action in U.S. Appl. Nos. 13/598,770; 13/598,782; 13/598,795.
International Search Report mailed Oct. 12, 2012.
International Search Report mailed Jan. 8, 2013.

\* cited by examiner

*Primary Examiner* — Ling Choi
*Assistant Examiner* — Chun-Cheng Wang
(74) *Attorney, Agent, or Firm* — C. Brant Cook

(57) ABSTRACT

Soil adsorption polymers and method for making same are provided.

18 Claims, No Drawings

SOIL ADSORPTION POLYMERS

CROSS REFERENCE TO RELATED APPLICATIONS

This application claims the benefit of U.S. Provisional Application No. 61/530,058 filed Sep. 1, 2011.

FIELD OF THE INVENTION

The present invention relates to soil adsorption polymers, and more particularly to soil adsorption polymers that provide a soil adsorption benefit and a method for making such soil adsorption polymers.

BACKGROUND OF THE INVENTION

Polymers that exhibit soil adsorption properties are known in the art. For example, Mirapol® polymers, which contain monomeric units derived from monomers such as acrylamide, acrylic acid, and quaternary ammonium compounds, such as MAPTAC and DADMAC, from Rhodia Chemie are known to exhibit soil adsorption properties. In addition, Lupasol® polymers, which are polyethyleneimines, from BASF also exhibit soil adsorption properties. However, there exists a need for polymers that provide improved soil adsorption properties compared to these known polymers.

One problem faced by formulators is how to make polymers that exhibit improved soil adsorption properties compared to known soil adsorption polymers.

SUMMARY OF THE INVENTION

The present invention fulfills the need described above by providing novel polymers that exhibit improved soil adsorption properties compared to known polymers that exhibit soil adsorption properties as measured according to the Soil Adsorption Test Method described herein.

One solution to the problem identified above is to make a polymer that comprises two or more monomeric units selected from the group consisting of:
a. nonionic monomeric units;
b. anionic monomeric units;
c. cationic monomeric units;
d. zwitterionic monomeric units; and
e. mixtures thereof;
such that the polymer exhibits a Soil Adsorption Value of at least 38 mg and/or at least 40 mg as measured according to the Soil Adsorption Test Method described herein.

In one example, a polymer comprising two or more monomeric units selected from the group consisting of:
a. nonionic monomeric units;
b. anionic monomeric units;
c. cationic monomeric units;
d. zwitterionic monomeric units; and
e. mixtures thereof;
wherein the polymer exhibits a Soil Adsorption Value of at least 38 mg as measured according to the Soil Adsorption Test Method described herein, is provided.

In another example, a method for making a polymer according to the present invention, wherein the method comprises the steps of:
i. providing two or more monomeric units selected from the group consisting of:
a. nonionic monomeric units;
b. anionic monomeric units;
c. cationic monomeric units;
d. zwitterionic monomeric units; and
e. mixtures thereof;
ii. polymerizing the two or more monomeric units such that a polymer that exhibits a Soil Adsorption Value of at least 38 mg as measured according to the Soil Adsorption Test Method described herein is produced, is provided.

Accordingly, the present invention provides novel polymers that exhibit improved soil adsorption properties compared to known polymers and a method for making same.

DETAILED DESCRIPTION OF THE INVENTION

Definitions

"Number average molecular weight" as used herein means the number average molecular weight $M_n$ as determined using gel permeation chromatography according to the protocol found in Colloids and Surfaces A. Physico Chemical & Engineering Aspects, Vol. 162, 2000, pg. 107-121.

"Weight average molecular weight" as used herein means the weight average molecular weight $M_w$ as determined using gel permeation chromatography according to the protocol found in Colloids and Surfaces A. Physico Chemical & Engineering Aspects, Vol. 162, 2000, pg. 107-121.

"Polydispersity Index" PDI as used herein means the ratio of the weight average molecular weight to the number average molecular weight, $M_w/M_n$, as determined using gel permeation chromatography.

"Monomeric unit" as used herein is a constituent unit (sometimes referred to as a structural unit) of a polymer.

"Nonionic monomeric unit" as used herein means a monomeric unit that exhibits no net charge at a pH of 7 and/or is identified as a nonionic monomeric unit herein. A nonionic monomeric unit may be derived from a nonionic monomer.

"Nonionic monomer" as used herein means a monomer that exhibits no net charge at a pH of 7 and/or is identified as a nonionic monomer herein.

"Anionic monomeric unit" as used herein means a monomeric unit that exhibits a net negative charge at a pH of 7 and/or is identified as an anionic monomeric unit herein. An anionic monomeric unit may be derived from an anionic monomer. An anionic monomeric unit is generally associated with one or more protons or cations such as cations of alkali metal or alkaline earth metal, for example sodium of cationic groups such as ammonium.

"Anionic monomer" as used herein means a monomer that exhibits a net negative charge at a pH of 7 and/or is identified as an anionic monomer herein. An anionic monomer is generally associated with one or more cations such as protons or cations of alkali metal or alkaline earth metal, for example sodium of cationic groups such as ammonium.

"Cationic monomeric unit" as used herein means a monomeric unit that exhibits a net positive charge at a pH of 7 and/or is identified as a cationic monomeric unit herein. A cationic monomeric unit may be derived from a cationic monomer. A cationic monomeric unit is generally associated with one or more anions such as a chloride ion, a bromide ion, a sulfonate group and/or a methyl sulfate group.

"Cationic monomer" as used herein means a monomer that exhibits a net positive charge at a pH of 7 and/or is identified as a cationic monomer herein. A cationic monomer is generally associated with one or more anions such as a chloride ion, a bromide ion, a sulfonate group and/or a methyl sulfate group.

"Zwitterionic monomeric unit" as used herein means a monomeric unit that exhibits both a negative charge and a positive charge on the same monomeric unit at a pH of 7 and/or is identified as a zwitterionic monomeric unit herein. A zwitterionic monomeric unit may be derived from a zwitterionic monomer. A zwitterionic monomeric unit is generally associated with one or more protons or cations such as cations of alkali metal or alkaline earth metal, for example sodium or cationic groups such as ammonium and one or more anions such as a chloride ion, a bromide ion, a sulfonate group and/or a methyl sulfate group.

"Zwitterionic monomer" as used herein means a monomer that exhibits both a negative charge and a positive charge on the same monomer at a pH of 7 and/or is identified as a zwitterionic monomeric unit herein. A zwitterionic monomer is generally associated with one or more protons or cations such as cations of alkali metal or alkaline earth metal, for example sodium or cationic groups such as ammonium and one or more anions such as a chloride ion, a bromide ion, a sulfonate group and/or a methyl sulfate group.

"Basis Weight" as used herein is the weight per unit area of a sample reported in lbs/3000 ft$^2$ or g/m$^2$ and is measured according to the Basis Weight Test Method described herein.

For clarity purposes, the total "% wt" values do not exceed 100% wt.

Polymers

The polymers of the present invention comprise two or more different types of monomeric units. As a result, the polymers of the present invention can be referred to as copolymers including terpolymers and higher rather than homopolymers, which consist of a single type of monomeric unit. The polymers of the present invention may be a terpolymer (3 different types of monomeric units). The polymers of the present invention may be a random copolymer. In one example, a polymer of the present invention is water-soluble and/or water-dispersible, which means that the polymer does not, over at least a certain pH and concentration range, form a two-phase composition in water at 23° C.±2.2° C. and a relative humidity of 50%±10%.

In one example, the polymers of the present invention exhibit a Number Average Molecular Weight of less than 2,000,000 g/mol and/or less than 1,750,000 g/mol and/or less than 1,700,000 g/mol and/or less than 1,500,000 g/mol and/or greater than 500,000 g/mol and/or greater than 900,000 g/mol. In another example, the polymers exhibit a Number Average Molecular Weight of from about 500,000 to 2,000,000 g/mol and/or from about 900,000 to 1,700,000 g/mol.

In another example, the polymers of the present invention exhibit a Soil Adsorption Value of at least 38 mg and/or at least 40 mg and/or at least 42 mg and/or at least 45 mg and/or at least 47 mg and/or at least 50 mg and/or at least 53 mg and/or at least 55 mg and/or at least 57 mg and/or at least 60 mg and/or at least 62 mg as measured according to the Soil Adsorption Test Method described herein.

In yet another example, the polymers of the present invention exhibit a charge density (at pH 4.5) of from about −0.1 meq/g and/or from about −0.05 meq/g and/or from about −0.02 meq/g and/or from about 0 meq/g and/or to about +0.1 meq/g and/or to about +0.09 meq/g and/or to about +0.08 meq/g and/or to about +0.06 meq/g and/or to about +0.05 meq/g and/or to about +0.02 meq/g as measured according to the Charge Density Test Method described herein. In still another example, the polymers of the present invention exhibit a charge density of from about −0.1 meq/g to about +0.1 meq/g and/or from −0.05 meq/g to about +0.1 meq/g and/or from about 0 to less than +0.1 meq/g and/or to less than +0.09 meq/g and/or to less than +0.08 meq/g and/or to less than +0.06 meq/g and/or to less than +0.05 meq/g as measured according to the Charge Density Test Method described herein.

In another example, the polymers exhibit a Polydispersity Index of less than 2.5 and/or of less than 2.0 and/or less than 1.7 and/or less than 1.5 and/or less than 1.3.

In one example, a polymer of the present invention comprises two or more monomeric units selected from the group consisting of: a. nonionic monomeric units; b. anionic monomeric units; c. cationic monomeric units; d. zwitterionic monomeric units; and e. mixtures thereof.

The polymers of the present invention may exhibit a Soil Adsorption Value of at least 38 mg as measured according to the Soil Adsorption Test Method described herein.

In one example, the polymers of the present invention are water-soluble.

a. Nonionic Monomeric Units

The nonionic monomeric units may be selected from the group consisting of: nonionic hydrophilic monomeric units, nonionic hydrophobic monomeric units, and mixtures thereof.

Non-limiting examples of nonionic hydrophilic monomeric units suitable for the present invention include nonionic hydrophilic monomeric units derived from nonionic hydrophilic monomers selected from the group consisting of: hydroxyalkyl esters of α,β-ethylenically unsaturated acids, such as hydroxyethyl or hydroxypropyl acrylates and methacrylates, glyceryl monomethacrylate, α,β-ethylenically unsaturated amides such as acrylamide, N,N-dimethylmethacrylamide, N-methylolacrylamide, α,β-ethylenically unsaturated monomers bearing a water-soluble polyoxyalkylene segment of the poly(ethylene oxide) type, such as poly(ethylene oxide) α-methacrylates (Bisomer S20W, S10W, etc., from Laporte) or α,ω-dimethacrylates, Sipomer BEM from Rhodia (ω-behenyl polyoxyethylene methacrylate), Sipomer SEM-25 from Rhodia (ω-tristyrylphenyl polyoxyethylene methacrylate), α,β-ethylenically unsaturated monomers which are precursors of hydrophilic units or segments, such as vinyl acetate, which, once polymerized, can be hydrolyzed in order to give rise to vinyl alcohol units or polyvinyl alcohol segments, vinylpyrrolidones, α,β-ethylenically unsaturated monomers of the ureido type, and in particular 2-imidazolidinone-ethyl methacrylamide (Sipomer WAM II from Rhodia), and mixtures thereof. In one example, the nonionic hydrophilic monomeric unit is derived from acrylamide.

Non-limiting examples of nonionic hydrophobic monomeric units suitable for the present invention include nonionic hydrophobic monomeric units derived from nonionic hydrophobic monomers selected from the group consisting of: vinylaromatic monomers such as styrene, alpha-methylstyrene, vinyltoluene, vinyl halides or vinylidene halides, such as vinyl chloride, vinylidene chloride, $C_1$-$C_{12}$ alkylesters of α,β-monoethylenically unsaturated acids such as methyl, ethyl or butyl acrylates and methacrylates, 2-ethylhexyl acrylate, vinyl esters or allyl esters of saturated carboxylic acids, such as vinyl or allyl acetates, propionates, versatates, stearates, α,β-monoethylenically unsaturated nitriles containing from 3 to 12 carbon atoms, such as acrylonitrile, methacrylonitrile, α-olefins such as ethylene, conjugated dienes, such as butadiene, isoprene, chloroprene, and mixtures thereof.

b. Anionic Monomeric Units

Non-limiting examples of anionic monomeric units suitable for the present invention include anionic monomeric units derived from anionic monomers selected from the group consisting of: monomers having at least one carboxylic function, for instance α,β-ethylenically unsaturated carboxylic acids or the corresponding anhydrides, such as acrylic, methacrylic or maleic acids or anhydrides, fumaric acid, itaconic acid, N-methacroylalanine, N-acryloylglycine, and their water-soluble salts, monomers that are precursors of carboxylate functions, such as tert-butyl acrylate, which, after polymerization, give rise to carboxylic functions by hydrolysis, monomers having at least one sulfate or sulfonate function, such as 2-sulfooxyethyl methacrylate, vinylbenzene sulfonic acid, allyl sulfonic acid, 2-acrylamido-2-methylpropane sulfonic acid (AMPS), sulfoethyl acrylate or methacrylate, sulfopropyl acrylate or methacrylate, and their water-soluble salts, monomers having at least one phosphonate or phosphate function, such as vinylphosphonic acid, etc., the esters of ethylenically unsaturated phosphates, such as the phosphates derived from hydroxyethyl methacrylate (Empicryl 6835 from Rhodia) and those derived from polyoxyalkylene methacrylates, and their water-soluble salts, and 2-carboxyethyl acrylate (CEA), and mixtures thereof. In one example, the anionic monomeric unit is derived from an anionic monomer selected from the group consisting of: acrylic acid, AMPS, CEA, and mixtures thereof. In another example, the anionic monomeric unit is derived from acrylic acid.

c. Cationic Monomeric Units

Non-limiting examples of cationic monomeric units suitable for the present invention include cationic monomeric units derived from cationic monomers selected from the group consisting of: N,N-(dialkylamino-w-alkyl)amides of α,β-monoethylenically unsaturated carboxylic acids, such as N,N-dimethylaminomethylacrylamide or -methacrylamide, 2-(N,N-dimethylamino)ethylacrylamide or -methacrylamide, 3-(N,N-dimethylamino)propylacrylamide or -methacrylamide, and 4-(N,N-dimethylamino)butylacrylamide or -methacrylamide, α,β-monoethylenically unsaturated amino esters such as 2-(dimethylamino)ethyl acrylate (DMAA), 2-(dimethylamino)ethyl methacrylate (DMAM), 3-(dimethylamino)propyl methacrylate, 2-(tert-butylamino)ethyl methacrylate, 2-(dipentylamino)ethyl methacrylate, and 2-(diethylamino)ethyl methacrylate, vinylpyridines, vinylamine, vinylimidazolines, monomers that are precursors of amine functions such as N-vinylformamide, N-vinylacetamide, which give rise to primary amine functions by simple acid or base hydrolysis, acryloyl- or acryloyloxyammonium monomers such as trimethylammonium propyl methacrylate chloride, trimethylammonium ethylacrylamide or -methacrylamide chloride or bromide, trimethylammonium butylacrylamide or -methacrylamide methyl sulfate, trimethylammonium propylmethacrylamide methyl sulfate, (3-methacrylamidopropyl)trimethyl ammonium chloride (MAPTAC), (3-methacrylamidopropyptrimethylammonium methyl sulphate (MAPTA-MES), (3-acrylamidopropyl)trimethylammonium chloride (APTAC), methacryloyloxyethyltrimethylammonium chloride or methyl sulfate, and acryloyloxyethyltrimethylammonium chloride; 1-ethyl-2-vinylpyridinium or 1-ethyl-4-vinylpyridinium bromide, chloride or methyl sulfate; N,N-dialkyldiallylamine monomers such as N,N-dimethyldiallylammonium chloride (DADMAC); polyquaternary monomers such as dimethylaminopropylmethacrylamide chloride and N-(3-chloro-2-hydroxypropyl)trimethyl ammonium (DIQUAT or DQ) and 2-hydroxy-N$^1$-(3-(2((3-methacrylamidopropyl)dimethylammino)-acetamido)propyl)-N$^1$, N$^1$, N$^3$, N$^3$, N$^3$ pentamethylpropane-1,3-diaminium chloride (TRIQUAT or TQ), and mixtures thereof. In one example, the cationic monomeric unit comprises a quaternary ammonium monomeric unit, for example a monoquaternary ammonium monomeric unit, a diquaternary ammonium monomeric unit and a triquaternary monomeric unit. In one example, the cationic monomeric unit is derived from MAPTAC. In another example, the cationic monomeric unit is derived from DADMAC. In still another example, the cationic monomeric unit is derived from TQ.

In one example, the cationic monomeric units are derived from cationic monomers selected from the group consisting of: dimethylaminoethyl (meth)acrylate, dimethylaminopropyl (meth)acrylate, di-tert-butylaminoethyl (meth)acrylate, dimethylaminomethyl (meth)acrylamide, dimethylaminopropyl (meth)acrylamide, ethylenimine, vinylamine, 2-vinylpyridine, 4-vinylpyridine and vinyl imidazole, and mixtures thereof.

In another example, the cationic monomeric units are derived from cationic monomers selected from the group consisting of: trimethylammonium ethyl (meth)acrylate bromide, chloride or methyl sulfate, trimethylammonium ethyl (meth)acrylate bromide, chloride or methyl sulfate, trimethylammonium ethyl (meth)acrylate bromide, chloride or methyl sulfate, dimethylaminoethyl (meth)acrylate benzyl chloride, 4-benzoylbenzyl dimethylammoniumethyl (meth)acrylate bromide, chloride or methyl sulfate, trimethylammonium ethyl (meth)acrylamido bromide, chloride, or methyl sulfate, trimethylammonium propyl (meth)acrylamido braomide, chloride, or methyl sulfate, vinyl benzyl trimethyl ammonium bromide, chloride or methyl sulfate, diallyldimethyl ammonium chloride, 1-ethyl-2-vinylpyridinium bromide, chloride or methyl sulfate, 4-vinylpyridinium bromide, chloride or methyl sulfate, and mixtures thereof.

d. Zwitterionic Monomeric Units

Non-limiting examples of zwitterionic monomeric units suitable for the present invention include zwitterionic monomeric units derived from zwitterionic monomers selected from the group consisting of: sulfobetaine monomers, such as sulfopropyl dimethylammonium ethyl methacrylate (SPE from Raschig), sulfopropyldimethylammonium propylmethacrylamide (SPP from Raschig), and sulfopropyl-2-vinylpyridinium (SPV from Raschig), 3-(3-methacrylamidopropyl)dimethylammonio)propane-1-sulfonate (SZ), phosphobetaine monomers, such as phosphatoethyl trimethylammonium ethyl methacrylate, carboxybetaine monomers, N-(carboxymethyl)-3-methacrylamido-N,N-dimethlpropan-1-aminium chloride (CZ). In one example, the zwitterionic monomeric unit is derived from CZ, SZ, and mixtures thereof.

In one example, a polymer of the present invention may comprise at least one monomeric unit selected from groups a (nonionic monomeric units) and b (anionic monomeric units) and at least one monomeric unit selected from groups c (cationic monomeric units) and d (zwitterionic monomeric units).

In one example, the polymer comprises at least 69.9% wt and/or at least 70% wt and/or at least 75% wt and/or at least 80% wt and/or at least 85% wt and/or at least 90% wt and/or at least 95% wt and/or at least 98% wt and/or at least 99% wt and/or at least 99.5% wt of a monomeric unit from group a. The balance of the polymer (no more than 30.1% wt and/or no more than 30% wt and/or no more than 25% wt and/or no more than 20% wt and/or no more than 15% wt and/or no more than 10% wt and/or no more than 5% wt and/or no more than 2% wt and/or no more than 1% wt and/or no more than 0.5% wt total) comprises one or more monomeric units selected from groups b, c, and d. In one example, the polymer comprises from about 70% to about 99.5% wt of a monomeric unit from group a, from about 0.1% to about 10% wt of a monomeric unit from group b, and from about 0.3% to about 29% wt of a monomeric unit from group c. In still another example, the polymer comprises from about 70% to about 99.5% wt of a monomeric unit from group a, from about 0.5% to about 30% wt combined of monomeric units from groups b and c.

In one example, the polymer comprises from about 70% to about 99.5% wt of a monomeric unit from group a, from about 0.1% to about 10% wt of a monomeric unit from group b, and from about 0.3% to about 29% wt of a monomeric unit from group d. In still another example, the polymer comprises from about 70% to about 99.5% wt of a monomeric unit from group a, from about 0.5% to about 30% wt combined of monomeric units from groups b and d.

In one example, the polymer comprises from about 70% to about 99.5% wt of a monomeric unit from group a, and the balance to 100% comprising from about 0.2% to about 29% wt of a monomeric unit from group c, and from about 0.3% to about 29% wt of a monomeric unit from group d. In still another example, the polymer comprises from about 70% to about 99.5% wt of a monomeric unit from group a, from about 0.5% to about 30% wt combined of monomeric units from groups c and d.

In one example, the polymer comprises at least 0.1% wt and/or at least 1% and/or at least 5% wt and/or at least 7% wt and/or at least 10% wt and/or to about 25% wt and/or to about 20% wt and/or to about 15% wt of a monomeric unit from group b.

In one example, polymer comprises at least 0.1% wt and/or at least 0.3% wt and/or at least 1% and/or at least 5% wt and/or at least 7% wt and/or at least 10% wt and/or to about 75% wt and/or to about 70% wt and/or to about 65% wt and/or to about 55% wt and/or to about 40% wt and/or to about 30% wt and/or to about 25% wt and/or to about 20% wt and/or to about 15% wt of a monomeric unit from group c.

In one example, polymer comprises at least 0.1% wt and/or at least 0.3% wt and/or at least 0.5% and/or at least 1% and/or at least 5% wt and/or at least 7% wt and/or at least 10% wt and/or to about 75% wt and/or to about 70% wt and/or to about 65% wt and/or to about 55% wt and/or to about 40% wt and/or to about 30% wt and/or to about 25% wt and/or to about 20% wt and/or to about 15% wt of a monomeric unit from group d.

In another example, the polymer comprises no more than 30.1% wt of a monomeric unit selected from the group consisting of: group b, group c, group d, and mixtures thereof.

In one example, the polymer may comprise a monomeric unit from group a and a monomeric unit from group b.

In one example, the polymer may comprise a monomeric unit from group a and a monomeric unit from group c.

In another example, the polymer of the present invention may comprise a monomeric unit from group a and a monomeric unit from group d.

In still another example, the polymer of the present invention may comprise a monomeric unit from group b and a monomeric unit from group c.

In still another example, the polymer of the present invention may comprise a monomeric unit from group b and a monomeric unit from group d.

In still another example, the polymer of the present invention may comprise a monomeric unit from group c and a monomeric unit from group d.

In yet another example, the polymer of the present invention may comprise a monomeric unit from group a, a monomeric unit from group b, and a monomeric unit from group c.

In even another example, the polymer of the present invention may comprise a monomeric unit from group a, a monomeric unit from group b, and a monomeric unit from group d.

In yet another example, the polymer of the present invention may comprise a monomeric unit from group a, a monomeric unit from group c, and a monomeric unit from group d.

In another example, the polymer of the present invention may comprise a monomeric unit from group b, a monomeric unit from group c, and a monomeric unit from group d.

In even yet another example, the polymer of the present invention may comprise a monomeric unit from group a, a monomeric unit from group b, a monomeric unit from group c and a monomeric unit from group d.

In one example, when present in the polymer, the monomeric unit from group b and the monomeric unit from group c are present in the polymer at a molar ratio of from about 3:1 to 1:3 and/or from about 2:1 to 1:2 and/or from about 1.3:1 to 1:1.3 and/or about 1:1 or less or about 1:1 or more.

In another example, when present in the polymer, the monomeric unit from group b and the monomeric unit from group d are present in the polymer at a molar ratio of from about 3:1 to 1:3 and/or from about 2:1 to 1:2 and/or from about 1.3:1 to 1:1.3 and/or about 1:1 or less or about 1:1 or more.

In another example, when present in the polymer, the monomeric unit from group c and the monomeric unit from group d are present in the polymer at a molar ratio of from about 3:1 to 1:3 and/or from about 2:1 to 1:2 and/or from about 1.3:1 to 1:1.3 and/or about 1:1 or less or about 1:1 or more.

In still another example, the polymer comprises a monomeric unit from group a and a monomeric unit from group c. For example, the polymer may comprise an acrylamide monomeric unit and a quaternary ammonium monomeric unit. The quaternary monomeric unit may be selected from the group consisting of: monoquaternary ammonium monomeric units, diquaternary ammonium monomeric units, and triquaternary ammonium monomeric units. In one example, the polymer may comprise at least 69.9% wt of the monomeric unit from group a and no more than 30.1% wt of the monomeric unit from group c.

In still another example, the polymer comprises a monomeric unit from group a and a monomeric unit from group b. For example, the polymer may comprise an acrylamide monomeric unit and an acrylic acid monomeric unit. In one example, the polymer may comprise at least 69.9% wt of the monomeric unit from group a and no more than 30.1% wt of the monomeric unit from group b.

In yet another example, the polymer comprises a monomeric unit from group b and a monomeric unit from group c. For example, the polymer may comprise an anionic monomeric unit derived from an anionic monomer selected from the group consisting of: acrylic acid, methacrylic acid, 2-acrylamido-2-methylpropane sulfonic acid, carboxyethyl acrylate, and mixtures thereof and a quaternary ammonium monomeric unit. The quaternary ammonium monomeric unit may be derived from a quaternary monomer selected from the group consisting of: monoquaternary ammonium monomeric units, diquaternary ammonium monomeric units, triquaternary ammonium monomeric units, and mixtures thereof. In one example, the polymer comprises an anionic monomeric unit derived from acrylic acid and a quaternary ammonium monomeric unit derived from MAPTAC. In one example, the polymer may comprise no more than 25% wt of the monomeric unit from group b and no more than 75% wt of the monomeric unit from group c.

In even yet another example, the polymer comprises a monomeric unit from group a and a monomeric unit from group b and a monomer unit from group c. For example, the polymer may comprise an acrylamide monomeric unit, and an anionic monomeric unit derived from an anionic monomer selected from the group consisting of: acrylic acid, methacrylic acid, 2-acrylamido-2-methylpropane sulfonic acid, carboxyethyl acrylate, and mixtures thereof and a quaternary ammonium monomeric unit. The quaternary ammonium monomeric unit may be derived from a quaternary monomer selected from the group consisting of: monoquaternary ammonium monomeric units, diquaternary ammonium monomeric units, triquaternary ammonium monomeric units, and mixtures thereof. In one example, the polymer comprises a nonionic monomeric unit derived from acrylamide, an anionic monomeric unit derived from acrylic acid, and a cationic monomeric unit derived from MAPTAC. In another example, the polymer comprises a nonionic monomeric unit derived from acrylamide, an anionic monomeric unit derived from acrylic acid, and a cationic monomeric unit derived from DADMAC. In still another example, the polymer comprises a nonionic monomeric unit derived from acrylamide, an anionic monomeric unit derived from acrylic acid, and a cationic monomeric unit derived from TQ. In another example, the polymer comprises a nonionic monomeric unit derived from acrylamide, an anionic monomeric unit derived from CEA, and a cationic monomeric unit derived from MAPTAC. In still another example, the polymer comprises a nonionic monomeric unit derived from acrylamide, an anionic monomeric unit derived from AMPS, and a cationic monomeric unit derived from MAPTAC. In one example, the polymer may comprise at least 69.9% wt of the monomeric unit from group a and no more than 30.1% wt combined of the monomeric units from groups b and c. In another example, the polymer may comprise from about 70% to about 99.5% wt of the monomeric unit from group a, from 0.1% to about 30% wt of the monomeric unit from group b, and from about 0.1% to about 30% wt of the monomeric unit from group c. In still another example, the polymer may comprise from about 70% to about 99.5% wt of the monomeric unit from group a and from about 0.5% to 30% wt combined of the monomeric units from groups b and c.

In even still yet another example, the polymer comprises a monomeric unit from group a and a monomeric unit from group c and a monomer unit from group d. For example, the polymer may comprise an acrylamide monomeric unit, a quaternary ammonium monomeric unit, and a zwitterionic monomeric unit selected from the group consisting of: CZ, SZ, and mixtures thereof. The quaternary ammonium monomeric unit may be derived from a quaternary monomer selected from the group consisting of: monoquaternary ammonium monomeric units, diquaternary ammonium monomeric units, triquaternary ammonium monomeric units, and mixtures thereof. In one example, the polymer comprises a nonionic monomeric unit derived from acrylamide, a cationic monomeric unit derived from MAPTAC, and a zwitterionic monomeric unit derived from CZ. In another example, the polymer comprises a nonionic monomeric unit derived from acrylamide, a cationic monomeric unit derived from MAPTAC, and a zwitterionic monomeric unit derived from SZ. In one example, the polymer may comprise at least 69.9% wt of the monomeric unit from group a and no more than 30.1% wt combined of the monomeric units from groups c and d. In another example, the polymer may comprise from about 70% to about 99.5% wt of the monomeric unit from group a, from 0.1% to about 30% wt of the monomeric unit from group c, and from about 0.1% to about 30% wt of the monomeric unit from group d. In still another example, the polymer may comprise from about 70% to about 99.5% wt of the monomeric unit from group a and from about 0.5% to 30% wt combined of the monomeric units from groups c and d.

In even yet another example, the polymer comprises a monomeric unit from group a and a monomeric unit from group b and a monomer unit from group d. For example, the polymer may comprise an acrylamide monomeric unit, and an anionic monomeric unit derived from an anionic monomer selected from the group consisting of: acrylic acid, methacrylic acid, 2-acrylamido-2-methylpropane sulfonic acid, carboxyethyl acrylate, and mixtures thereof and a zwitterionic monomeric unit selected from the group consisting of: CZ, SZ, and mixtures thereof. In one example, the polymer comprises a nonionic monomeric unit derived from acrylamide, an anionic monomeric unit derived from acrylic acid, and zwitterionic monomeric unit derived from CZ. In another example, the polymer comprises a nonionic monomeric unit derived from acrylamide, an anionic monomeric unit derived from acrylic acid, and a zwitterionic monomeric unit derived from SZ. In one example, the polymer may comprise at least 69.9% wt of the monomeric unit from group a and no more than 30.1% wt combined of the monomeric units from groups b and d. In another example, the polymer may comprise from about 70% to about 99.5% wt of the monomeric unit from group a, from 0.1% to about 30% wt of the monomeric unit from group b, and from about 0.1% to about 30% wt of the monomeric unit from group d. In still another example, the polymer may comprise from about 70% to about 99.5% wt of the monomeric unit from group a and from about 0.5% to 30% wt combined of the monomeric units from groups b and d.

In even yet another example, the polymer comprises a monomeric unit from group a and a monomeric unit from group d. For example, the polymer may comprise an acrylamide monomeric unit, and a zwitterionic monomeric unit selected from the group consisting of: CZ, SZ, and mixtures thereof. In one example, the polymer comprises a nonionic monomeric unit derived from acrylamide and zwitterionic monomeric unit derived from CZ. In another example, the polymer comprises a nonionic monomeric unit derived from acrylamide and a zwitterionic monomeric unit derived from SZ. In one example, the polymer may comprise at least 69.9% wt of the monomeric unit from group a and no more than 30.1% wt of the monomeric unit from group d. In another example, the polymer may comprise from about 70% to about 99.5% wt of the monomeric unit from group a, from 0.5% to about 30% wt of the monomeric unit from group d.

In one example, the polymer of the present invention comprises a nonionic hydrophilic monomeric unit. Non-limiting examples of suitable hydrophilic monomeric units are derived from nonionic hydrophilic monomers selected from the group consisting of: hydroxyalkyl esters of $\alpha,\beta$-ethylenically unsaturated acids, $\alpha,\beta$-ethylenically unsaturated amides, $\alpha,\beta$-ethylenically unsaturated monoalkyl amides, $\alpha,\beta$-ethylenically unsaturated dialkyl amides, $\alpha,\beta$-ethylenically unsaturated monomers bearing a water-soluble polyoxyalkylene segment of the poly(ethylene oxide) type, $\alpha,\beta$-ethylenically unsaturated monomers which are precursors of hydrophilic units or segments, vinylpyrrolidones, $\alpha,\beta$-ethylenically unsaturated monomers of the ureido type, and mixtures thereof. In one example, the nonionic hydrophilic monomeric unit is derived from acrylamide.

In another example, the polymer of the present invention comprises a nonionic hydrophobic monomeric unit. Non-limiting examples of suitable nonionic hydrophobic monomeric units are derived from nonionic hydrophobic monomers selected from the group consisting of: vinylaromatic monomers, vinyl halides, vinylidene halides, $C_1$-$C_{12}$ alkylesters of $\alpha,\beta$-monoethylenically unsaturated acids, vinyl esters of saturated carboxylic acids, allyl esters of saturated carboxylic acids, $\alpha,\beta$-monoethylenically unsaturated nitriles containing from 3 to 12 carbon atoms, $\alpha$-olefins, conjugated dienes, and mixtures thereof.

In one example, the polymer comprises an anionic monomeric unit. Non-limiting examples of suitable anionic monomeric units are derived from anionic monomers selected from the group consisting of: monomers having at least one carboxylic function, for instance α,β-ethylenically unsaturated carboxylic acids or the corresponding anhydrides, monomers that are precursors of carboxylate functions, monomers having at least one sulfate or sulfonate function, monomers having at least one phosphonate or phosphate function, esters of ethylenically unsaturated phosphates, and mixtures thereof. In one example, the anionic monomeric unit is derived from an anionic monomer selected from the group consisting of: acrylic acid, methacrylic acid, 2-acrylamido-2-methylpropane sulfonic acid, carboxyethyl acrylate, and mixtures thereof.

In one example, the polymer comprises a cationic monomeric unit. Non-limiting examples of suitable cationic monomeric units are derived from cationic monomers selected from the group consisting of: acryloyl- or acryloyloxyammonium monomers, 1-ethyl-2-vinylpyridinium or 1-ethyl-4-vinylpyridinium bromide, chloride or methyl sulfate, N,N-dialkyldiallylamine monomers, polyquaternary monomers, N,N-(dialkylamino-w-alkyl)amides of α,β-monoethylenically unsaturated carboxylic acids, α,β-monoethylenically unsaturated amino esters, vinylpyridines, vinylamine, vinylimidazolines, monomers that are precursors of amine functions which give rise to primary amine functions by simple acid or base hydrolysis, and mixtures thereof. In one example, the cationic monomeric unit is derived from MAPTAC. In another example, the cationic monomeric unit is derived from DADMAC. In still another example, the cationic monomeric unit is derived from 2-hydroxy-$N^1$-(3-(2 ((3-methacrylamidopropyl)dimethylammino)-acetamido) propyl)-$N^1,N^1,N^3,N^3,N^3$-pentamethylpropane-1,3-diaminium chloride.

Process for Making Polymers

The polymers of the present invention may be made by any suitable process known in the art. For example, the polymer may be made by radical polymerization.

The polymers of the present invention can be made by a wide variety of techniques, including bulk, solution, emulsion, or suspension polymerization. Polymerization methods and techniques for polymerization are described generally in Encyclopedia of Polymer Science and Technology, Interscience Publishers (New York), Vol. 7, pp. 361-431 (1967), and Kirk-Othmer Encyclopedia of Chemical Technology, 3rd edition, Vol 18, pp. 740-744, John Wiley & Sons (New York), 1982, both incorporated by reference herein. See also Sorenson, W. P. and Campbell, T. W., Preparative Methods of Polymer Chemistry. 2nd edition, Interscience Publishers (New York), 1968, pp. 248-251, incorporated by reference herein, for general reaction techniques suitable for the present invention. In one example, the polymers are made by free radical copolymerization, using water soluble initiators. Suitable free radical initiators include, but are not limited to, thermal initiators, redox couples, and photochemical initiators. Redox and photochemical initiators may be used for polymerization processes initiated at temperatures below about 30° C. (86° F.). Such initiators are described generally in Kirk-Othmer Encyclopedia of Chemical Technology, 3rd edition, John Wiley & Sons (New York), Vol. 13, pp. 355-373 (1981), incorporated by reference herein. Typical water soluble initiators that can provide radicals at 30° C. or below include redox couples, such as potassium persulfate/silver nitrate, and ascorbic acid/hydrogen peroxide. In one example, the method utilizes thermal initiators in polymerization processes conducted above 40° C. (104° F.). Water soluble initiators that can provide radicals at 40° C. (104° F.) or higher can be used. These include, but are not limited to, hydrogen peroxide, ammonium persulfate, and 2,2'-azobis(2-amidinopropane) dihydrochloride. In one example, water soluble starting monomers are polymerized in an aqueous alcohol solvent at 60° C. (140° F.) using 2,2'-azobis(2-amidinopropane) dihydrochloride as the initiator. The solvent should typically contain at least about 10% by volume, of alcohol in order to prevent the polymerization reaction medium from gelling. Suitable alcohols for use in such reaction include low molecular weight alcohols such as, but not limited to, methanol, ethanol, isopropanol, and butanol.

Another technique is a solution polymerization as described in U.S. Pat. No. 3,317,370, Kekish, issued May 2, 1967 and U.S. Pat. No. 3,410,828, Kekish, issued Nov. 12, 1968, both incorporated herein by reference. According to such process, the acrolein, or other aldehydic monomer, is copolymerized with a non-nucleophilic, water soluble, nitrogen-heterocyclic polymerizable monomer and a redox initiator system. The copolymer is then made cationic by reacting the copolymer with a water soluble amine or amine quaternary. Amines, including amine quaternaries, that are useful include, but are not limited to, primary, secondary, and tertiary amines such as ethylene diamine, diethylene triamine, triethylene tetramine, tetraethylene pentamine, or partial or fully quaternized derivatives of any of the foregoing, hydrazides and quaternaries thereof such as betaine hydrazide chloride, N-N-dimethylglycine hydrazide, unsymmetrical dimethyl hydrazides, polymers, such as those formed by reaction of urea and polyalkylene polyamines, guanidines, biguanides, guanylureas, mono and polyhydroxy polyamines and quaternaries thereof, etc. When using this emulsion copolymerization technique, it will be necessary to control molecular weight to within the ranges provided herein.

In one example, a method for making a polymer according to the present invention comprises the steps of:
i. providing two or more monomeric units selected from the group consisting of:
 a. nonionic monomeric units;
 b. anionic monomeric units;
 c. cationic monomeric units;
 d. zwitterionic monomeric units; and
 e. mixtures thereof; and
ii. polymerizing the two or more monomeric units such that a polymer that exhibits a Soil Adsorption Value of at least 38 mg as measured according to the Soil Adsorption Test Method described herein is produced. In one example, the step of polymerizing comprises the step of mixing the two or more monomeric units or the monomers from which they are derived with water to form a monomer solution and polymerizing the monomers to form a polymer solution. The monomer solution and/or polymer solution may be deoxygenated. In addition, the monomer solution and/or polymer solution may be subjected (heated) to a temperature of at least 25° C., such as 60° C. The temperatures used to make the polymer may be any suitable temperature so long as a polymer according to the present invention is produced. The monomer solution and/or polymer solution may be subject to such temperature for a time sufficient to polymerize the monomeric units into a polymer, for example at least 10 minutes, and/or at least 18 hours depending on the reaction conditions. An initiator, such as a free-radical initiator, may be added to the monomer solution and/or polymer solution to polymerize the monomeric units (monomers) within the monomer solution to produce a polymer of the present invention. The levels of free radical initiator(s) used to make the polymer may be any suitable level so long as a polymer according to the present invention is produced. The levels of the various monomeric units (monomers) used to make the polymer may be any suitable level so long as a polymer according to the present invention is produced.

Non-limiting Synthesis Examples

Sample Preparation

Initiator Solution Preparation 10 ml of water is added to a flask along with 1 gram of 2,2'-azobis(2-methylpropionamidine) dihydrochloride (available from Wako Chemicals), herein called V-50. This solution is sparged with argon gas to remove oxygen.

Monomer Preparation

Synthesis of 2-Hydroxy-$N^1$-(3-(2-((3-Methacrylamidopropyl)Dimethylammonio)-Acetamido)Propyl)-$N^1,N^1,N^3,N^3,N^3$-Pentamethylpropane-1,3-Diaminium Chloride (Herein Called TQ)

To a jacketed round bottom flask equipped with mechanical stirrer, gas inlet, condenser and thermometer is added 340.6 grams of dimethylamino propyl methacrylamide (DMAPMA, available from Sigma-Aldrich), 238.8 grams of methyl chloroacetate (available from Sigma-Aldrich), 0.5 g 4-methoxy phenol (available from Sigma-Aldrich), and 423 grams of methanol (available from Sigma-Aldrich). The round bottom flask is heated at 70° C. for 5 hours. This reaction is cooled to room temperature and then 0.5 grams of 4-methoxy phenol (available from Sigma-Aldrich) and 225 grams of dimethylaminoipropylamine (available from Sigma-Aldrich) is added evenly over a 2 hour period. After 2 hours the reaction is heated to 65° C. for 2 hours after which methanol is distilled out at 50° C. under vacuum. To this is added 690 grams of (3-chloro-2-hydroxypropyl)trimethylammonium chloride (available as a 60% aqueous solution from Sigma-Aldrich). The temperature is maintained at 65-70° C. for 2 hours. During these 2 hours methanol is stripped out and water is added to make a 55% solution in water based on weight. The reaction is continued in water at 65-70° C. for another hour to yield the TQ monomer.

Synthesis of 3-((3-Methacrylamidopropyl)Dimethylammonio)Propane-1-Sulfonate (Herein Called SZ)

Into a round bottom flask is added 26.4 grams of anhydrous acetonitrile (available from Sigma-Aldrich) and 15.5 grams of propane sultone (available from Sigma-Aldrich), and this is stirred for 30 minutes. After the 30 minutes, a solution of 25.6 grams of DMAPMA in 56.5 grams of acetonitrile is added. The mixture is stirred and warmed to 35° C. A white precipitate quickly forms. Once the white precipitate takes up the bulk of the volume, the liquid is decanted. The solid is washed once with acetonitrile and again the liquid is removed by decanting. The solids are then washed in 2× volume diethyl ether. They are then filtered via funnel and washed with copious amounts (via filtration) of diethyl ether. The NMR structure is consistent with the structure of the target molecule SZ.

Synthesis of N-(Carboxymethyl)-3-Methacrylamido-N,N-Dimethylpropan-Aminium Chloride (Herein Called CZ)

To a round bottom flask is added 16.5 grams of methyl bromoacetate (available from Sigma-Aldrich), 74 grams of tetrahydrofuran (THF, available from Sigma-Aldrich), and 16.5 grams of DMAPMA. The solution is stirred for 16 hours at 25° C., and then the stirring is discontinued. After settling, the top layer of THF is discarded. The lower layer is washed with 50 mL of hexanes (available from Sigma-Aldrich) twice and becomes a viscous material. The material is then dissolved in 15 mL of methanol (available from Sigma-Aldrich) and precipitated into 150 mL of diethyl ether (available from Sigma-Aldrich). The precipitate is washed several times with diethylether until it becomes a viscous semi-solid. It is then dried overnight under high vacuum at room temperature. A small portion is taken for NMR analysis. The remainder of the intermediate is placed in a glass desiccator containing calcium chloride until the next step.

3.3 grams of the intermediate from above is dissolved in 10 mL of deionized water and run through a column consisting of 50 mL of Dowex Marathon A hydroxide exchange resin (available from VWR Scientific) in a glass column of 2.5 cm diameter at 2.7 mL/min. The effluent is collected and 13 mL of 1N hydrochloric acid (available from Sigma-Aldrich) is added. The water is dried off under vacuum at room temperature. The sample is then dried overnight under high vacuum at room temperature. The material is removed from the vacuum and a small portion is taken for NMR analysis. 2.71 g of deionized water is added to the material to form the finished product CZ which is stored as a solution in water.

Polymer Preparation

Into a reaction vessel are added the monomers in the amounts listed for the examples in Table 1 below and 456 g of water. The monomers, acrylamide (herein called AAM), acrylic acid (herein called AA), diallyldimethylammonium chloride (herein called DADMAC), 2-carboxy ethyl acrylate (herein called CEA), 2-acrylamido-2-methylpropane sulfonic acid (herein called AMPS) and [3-(methyacryloylamino)propyl]trimethylammonium chloride (herein called MAPTAC), are all available from Sigma Aldrich. MAPTAC is used as a 50% w/w solution. TQ, SZ and CZ are used as prepared above. The reaction vessel is sparged with nitrogen to remove oxygen from the system and a nitrogen atmosphere is maintained in the vessel. The reaction vessel and contents are heated to a temperature of 60° C.

Once the contents have reached 60° C., the initiator solution 1 mL of the V-50 as prepared above is added as a 10% solution (except for Example 1.17 which used 0.0562 g of V-50 neat). The reaction is kept at 60° C. for 48 hours.

The following tables set forth non-limiting examples of polymers of the present invention that were made.

TABLE 1

Examples: Polymer Construction Data

| Ex. | AAM (g) | AA (g) | MAPTAC (g) | DADMAC (g) | TQ (g) | CEA (g) | AMPS (g) | SZ (g) | CZ (g) |
|---|---|---|---|---|---|---|---|---|---|
| 1.1 | 21.60 | 0.00 | 2.40 | 0.00 | 0.00 | 0.00 | 0.00 | 0.00 | 0.00 |
| 1.2 | 21.60 | 0.31 | 2.09 | 0.00 | 0.00 | 0.00 | 0.00 | 0.00 | 0.00 |
| 1.3 | 21.60 | 0.60 | 1.81 | 0.00 | 0.00 | 0.00 | 0.00 | 0.00 | 0.00 |
| 1.4 | 21.60 | 1.20 | 1.21 | 0.00 | 0.00 | 0.00 | 0.00 | 0.00 | 0.00 |

TABLE 1-continued

Examples: Polymer Construction Data

| Ex. | AAM (g) | AA (g) | MAPTAC (g) | DADMAC (g) | TQ (g) | CEA (g) | AMPS (g) | SZ (g) | CZ (g) |
|---|---|---|---|---|---|---|---|---|---|
| 1.5 | 21.60 | 1.80 | 0.61 | 0.00 | 0.00 | 0.00 | 0.00 | 0.00 | 0.00 |
| 1.6 | 21.59 | 2.40 | 0.00 | 0.00 | 0.00 | 0.00 | 0.00 | 0.00 | 0.00 |
| 1.7 | 0.00 | 6.00 | 18.00 | 0.00 | 0.00 | 0.00 | 0.00 | 0.00 | 0.00 |
| 1.8 | 2.41 | 5.40 | 16.20 | 0.00 | 0.00 | 0.00 | 0.00 | 0.00 | 0.00 |
| 1.9 | 7.20 | 4.20 | 12.60 | 0.00 | 0.00 | 0.00 | 0.00 | 0.00 | 0.00 |
| 1.10 | 12.00 | 3.00 | 9.00 | 0.00 | 0.00 | 0.00 | 0.00 | 0.00 | 0.00 |
| 1.11 | 16.79 | 1.81 | 5.42 | 0.00 | 0.00 | 0.00 | 0.00 | 0.00 | 0.00 |
| 1.12 | 19.22 | 1.20 | 3.60 | 0.00 | 0.00 | 0.00 | 0.00 | 0.00 | 0.00 |
| 1.13 | 20.41 | 0.90 | 2.70 | 0.00 | 0.00 | 0.00 | 0.00 | 0.00 | 0.00 |
| 1.14 | 21.61 | 0.60 | 1.80 | 0.00 | 0.00 | 0.00 | 0.00 | 0.00 | 0.00 |
| 1.15 | 22.81 | 0.31 | 0.92 | 0.00 | 0.00 | 0.00 | 0.00 | 0.00 | 0.00 |
| 1.16 | 23.51 | 0.12 | 0.36 | 0.00 | 0.00 | 0.00 | 0.00 | 0.00 | 0.00 |
| 1.17 | 23.75 | 0.06 | 0.18 | 0.00 | 0.00 | 0.00 | 0.00 | 0.00 | 0.00 |
| 1.18 | 23.76 | 0.06 | 0.18 | 0.00 | 0.00 | 0.00 | 0.00 | 0.00 | 0.00 |
| 1.19 | 23.87 | 0.03 | 0.10 | 0.00 | 0.00 | 0.00 | 0.00 | 0.00 | 0.00 |
| 1.20 | 24.09 | 0.00 | 0.00 | 0.00 | 0.00 | 0.00 | 0.00 | 0.00 | 0.00 |
| 1.21 | 23.76 | 0.07 | 0.00 | 0.17 | 0.00 | 0.00 | 0.00 | 0.00 | 0.00 |
| 1.22 | 23.77 | 0.0285 | 0.00 | 0.00 | 0.212 | 0.00 | 0.00 | 0.00 | 0.00 |
| 1.23 | 23.76 | 0.00 | 0.145 | 0.00 | 0.00 | 0.0939 | 0.00 | 0.00 | 0.00 |
| 1.24 | 23.76 | 0.00 | 0.13 | 0.00 | 0.00 | 0.00 | 0.12 | 0.00 | 0.00 |
| 1.25 | 23.77 | 0.00 | 0.00 | 0.00 | 0.00 | 0.00 | 0.00 | 0.252 | 0.00 |
| 1.26 | 23.76 | 0.00 | 0.00 | 0.00 | 0.00 | 0.00 | 0.00 | 0.00 | 0.240 |
| 1.27 | 23.52 | 0.00 | 0.00 | 0.00 | 0.00 | 0.00 | 0.00 | 0.00 | 0.479 |
| 1.28 | 23.76 | 0.00 | 0.003 | 0.00 | 0.00 | 0.00 | 0.00 | 0.00 | 0.240 |
| 1.29 | 23.76 | 0.002 | 0.00 | 0.00 | 0.00 | 0.00 | 0.00 | 0.00 | 0.240 |

TABLE 2

Examples: Polymer Solution Data

| Ex. | Mass Composition of Monomers | Solids (%) | Polymer Solution (g) | Polymer Solution + Water (g) | Conc. (%) |
|---|---|---|---|---|---|
| 2.1 | 90% AAM, 10% MAPTAC | 5.44 | 0.4253 | 115.68 | 0.02 |
| 2.2 | 90% AAM, 1.3% AA, 8.7% MAPTAC | 5.41 | 0.3927 | 106.24 | 0.02 |
| 2.3 | 90% AAM, 2.5% AA, 7.5% MAPTAC | 5.45 | 0.4013 | 109.34 | 0.02 |
| 2.4 | 90% AAM, 5% AA, 5% MAPTAC | 5.43 | 0.3974 | 107.89 | 0.02 |
| 2.5 | 90% AAM, 7.5% AA, 2.5% MAPTAC | 5.42 | 0.7522 | 203.84 | 0.02 |
| 2.6 | 90% AAM, 10% AA | 5.42 | 0.3985 | 108.00 | 0.02 |
| 2.7 | 25% AA, 75% MAPTAC | 5.25 | 0.3823 | 100.36 | 0.02 |
| 2.8 | 10% AAM, 22.5% AA, 67.5% MAPTAC | 5.24 | 0.3788 | 99.27 | 0.02 |
| 2.9 | 30% AAM, 17.5% AA, 52.5% MAPTAC | 5.26 | 0.3979 | 104.64 | 0.02 |
| 2.10 | 50% AAM, 12.5% AA, 37.5% MAPTAC | 5.36 | 0.3692 | 98.95 | 0.02 |
| 2.11 | 69.9% AAM, 7.5% AA, 22.6% MAPTAC | 5.30 | 0.3810 | 100.97 | 0.02 |
| 2.12 | 80% AAM, 5% AA, 15% MAPTAC | 5.31 | 0.3899 | 103.53 | 0.02 |
| 2.13 | 85% AAM, 3.7% AA, 11.3% MAPTAC | 5.30 | 0.4403 | 116.69 | 0.02 |
| 2.14 | 90% AAM, 2.5% AA, 7.5% MAPTAC | 5.26 | 0.3800 | 99.93 | 0.02 |
| 2.15 | 94.9% AAM, 1.3% AA, 3.8% MAPTAC | 5.34 | 0.3982 | 106.34 | 0.02 |
| 2.16 | 98% AAM, 0.5% AA, 1.5% MAPTAC | 2.54 | 0.7969 | 101.21 | 0.02 |
| 2.17 | 99% AAM, 0.25% AA, 0.75% MAPTAC | 2.56 | 0.7944 | 101.68 | 0.02 |
| 2.18 | 99% AAM, 0.25% AA, 0.75% MAPTAC | 5.32 | 0.3751 | 100.49 | 0.02 |
| 2.19 | 99.5% AAM, 0.125% AA, 0.375% MAPTAC | 2.57 | 0.7850 | 100.89 | 0.02 |
| 2.20 | 100% AAM (Comparative Example) | 5.23 | 0.3979 | 104.02 | 0.02 |
| 2.21 | 99% AAM, 0.3% AA, 0.7% DADMAC | 5.40 | 0.3876 | 104.70 | 0.02 |
| 2.22 | 99% AAM, 0.12% AA, 0.88% TQ | 5.16 | 3.8100 | 980.46 | 0.02 |
| 2.23 | 99.01% AAM, 0.39% CEA, 0.6% MAPTAC | 5.27 | 0.3914 | 103.13 | 0.02 |
| 2.24 | 99% AAM, 0.5% AMPS, 0.5% MAPTAC | 5.40 | 0.3823 | 103.22 | 0.02 |
| 2.25 | 98.95% AAM, 1.05% SZ | 5.29 | 0.3791 | 100.25 | 0.02 |
| 2.26 | 99% AAM, 1% CZ | 5.28 | 0.4004 | 105.73 | 0.02 |
| 2.27 | 98% AAM, 2% CZ | 5.13 | 0.4055 | 104.15 | 0.02 |
| 2.28 | 98.99% AAM, 0.01% MAPTAC, 1% CZ | 5.15 | 0.5177 | 133.36 | 0.02 |
| 2.29 | 98.99% AAM, 0.01% AA, 1% CZ | 5.14 | 0.5941 | 152.90 | 0.02 |
| 2.30 | Mirapol ® HSC300 (Comparative Example) | 20.81 | 0.1378 | 143.38 | 0.02 |
| 2.31 | Deionized Water (Control) | | | | |

TABLE 3

Test Results

| Ex. | Mass Composition of Monomers | Mn | PDI | Soil Adsorption Value (mg) | St Dev (mg) | % Soil Retained$_{avg}$ (%) | St Dev (%) |
|---|---|---|---|---|---|---|---|
| 3.1 | 90% AAM, 10% MAPTAC | 1,211,000 | 1.240 | 41 | 1 | 23 | 1 |
| 3.2 | 90% AAM, 1.3% AA, 8.7% MAPTAC | 948,200 | 1.239 | 42 | 6 | 24 | 3 |
| 3.3 | 90% AAM, 2.5% AA, 7.5% MAPTAC | 852,500 | 1.351 | 47 | 2 | 26 | 1 |
| 3.4 | 90% AAM, 5% AA, 5% MAPTAC | 753,500 | 1.402 | 40 | 3 | 23 | 2 |
| 3.5 | 90% AAM, 7.5% AA, 2.5% MAPTAC | 970,300 | 1.271 | 43 | 3 | 24 | 2 |
| 3.6 | 90% AAM, 10% AA | 1,021,000 | 1.222 | 46 | 1 | 26 | 0 |
| 3.7 | 25% AA, 75% MAPTAC | 201,500 | 1.823 | 44 | 3 | 24 | 2 |
| 3.8 | 10% AAM, 22.5% AA, 67.5% MAPTAC (Comparative Example) | 226,400 | 1.712 | 32 | 1 | 18 | 1 |
| 3.9 | 30% AAM, 17.5% AA, 52.5% MAPTAC (Comparative Example) | 311,800 | 1.604 | 32 | 2 | 18 | 1 |
| 3.10 | 50% AAM, 12.5% AA, 37.5% MAPTAC (Comparative Example) | 583,800 | 1.406 | 34 | 3 | 19 | 2 |
| 3.11 | 69.9% AAM, 7.5% AA, 22.6% MAPTAC | | | 38 | 1 | 21 | 1 |
| 3.12 | 80% AAM, 5% AA, 15% MAPTAC | 821,000 | 1.269 | 40 | 1 | 23 | 1 |
| 3.13 | 85% AAM, 3.7% AA, 11.3% MAPTAC | 865,600 | 1.241 | 44 | 3 | 25 | 2 |
| 3.14 | 90% AAM, 2.5% AA, 7.5% MAPTAC | | | 45 | 0 | 25 | 0 |
| 3.15 | 94.9% AAM, 1.3% AA, 3.8% MAPTAC | 927,100 | 1.222 | 53 | 3 | 30 | 1 |
| 3.16 | 98% AAM, 0.5% AA, 1.5% MAPTAC | | | 55 | 3 | 31 | 2 |
| 3.17 | 99% AAM, 0.25% AA, 0.75% MAPTAC | 858,100 | 1.302 | 57 | 3 | 32 | 2 |
| 3.18 | 99% AAM, 0.25% AA, 0.75% MAPTAC | 814,200 | 1.293 | 57 | 5 | 32 | 3 |
| 3.19 | 99.5% AAM, 0.125% AA, 0.375% MAPTAC | 1,212,000 | 1.285 | 65 | 3 | 36 | 2 |
| 3.20 | 100% AAM (Comparative Example) | 1,116,600 | 1.204 | 40 | 3 | 22 | 2 |
| 3.21 | 99% AAM, 0.3% AA, 0.7% DADMAC | 520,400 | 1.432 | 53 | 4 | 30 | 2 |
| 3.22 | 99% AAM, 0.12% AA, 0.88% TQ | 1,050,000 | 1.165 | 54 | 2 | 30 | 1 |
| 3.23 | 99.01% AAM, 0.39% CEA, 0.6% MAPTAC | 791,200 | 1.219 | 61 | 4 | 34 | 2 |
| 3.24 | 99% AAM, 0.5% AMPS, 0.5% MAPTAC | 644,400 | 1.579 | 59 | 2 | 33 | 1 |
| 3.25 | 98.95% AAM, 1.05% SZ | 542,800 | 1.566 | 54 | 4 | 30 | 2 |
| 3.26 | 99% AAM, 1% CZ | 862,700 | 1.269 | 57 | 3 | 32 | 1 |
| 3.27 | 98% AAM, 2% CZ | | | 62 | 2 | 35 | 1 |
| 3.28 | 98.99% AAM, 0.01% MAPTAC, 1% CZ | | | 60 | 4 | 33 | 2 |
| 3.29 | 98.99% AAM, 0.01% AA, 1% CZ | | | 60 | 2 | 33 | 1 |
| 3.30 | Mirapol ® HSC300* (Comparative Example) | | | 34 | 3 | 19 | 1 |
| 3.31 | Deionized Water (Control) | | | 20 | 4 | 11 | 2 |

*Mirapol ® HSC 300 was obtained from Rhodia S. A. (Paris, France).

Test Methods

Determination of Percent Solids

An empty weigh pan (VWR disposable aluminum crinkle dishes with tabs, VWR Catalog #25433-010; or equivalent pan) is weighed to within ±0.1 mg (Weight$_{Pan}$). An aliquot of a polymer solution, for example a polymer solution as prepared above, 2.5±0.5 grams, is placed into the pan and weighed to within ±0.1 mg (Weight$_{Pan+Polymer\ Solution}$). The pan and the polymer solution are placed in an 80° C. ventilated oven, uncovered for 12 hours. After cooling to room temperature, the pan and the polymer solids are then weighed to within ±0.1 mg (Weight$_{Pan+Polymer\ Solid}$). The percent solids is calculated as follows:

$$PercentSolids(\%) = \left(\frac{Weight_{Pan+PolymerSolid} - Weight_{Pan}}{Weight_{Pan+PolymerSolution} - Weight_{Pan}}\right)*100\%$$

Preparation of 0.02% Polymer Solution

Using the amounts listed in Table 2, the polymer solutions prepared above need to be diluted to 0.02% with deionized water or for any other polymer solution to be tested that is greater than 0.02% percent solids, it needs to be diluted with deionized water to 0.02% using the following equation:

$$\frac{Weight_{PolymerSolution}}{Weight_{PolymerSolution+Water}} = \frac{0.02\%}{PercentSolids(\%)}$$

If the polymer solution is less than 0.02% percent solids, then no dilution is necessary.

A receiving vessel large enough to hold the diluted solution is tared. The desired amount of the original polymer solution is added to the receiving vessel and the weight (of the solution only) recorded to within ±1 mg (Weight$_{polymer\ Solution}$). The polymer solution is then diluted to 0.02% with deionized water and the weight recorded to within ±0.01 g (Weight$_{polymer\ Solution+Water}$). The diluted solutions are capped and allowed to sit for 24 hours with occasional agitation prior to use to ensure polymer dissolution. The concentration is calculated as follows:

$$Concentration(\%) = \frac{Weight_{PolymerSolution} * PercentSolids(\%)}{Weight_{PolymerSolution+Water}}$$

Polymer Molecular Weight Determination

Polymer molecular mass is determined by GPC SEC/MALS. The HPLC is a Waters Alliance 2695 HPLC with an auto injector equipped with a bank of two linear µStyragel HT columns at room temperature. The flow rate is 1.0 mL/min and the mobile phase is dimethyl sulfoxide (DMSO) with 0.1% (weight/volume) LiBr. The detectors are Wyatt Dawn EOS Light scattering detector calibrated with toluene and normalized using 25K dextran in mobile phase and a Wyatt Optilab rEX refractive index detector at 30° C.

Samples for analysis are prepared at a known concentration in the range of 1 to 5 mg/mL. Samples are filtered using 0.2 μm polypropylene membrane filters. The injection volume is 100 μL. The data are collected and analyzed using ASTRA 5.3.4.14. Values for do/dc are calculated from the RI trace assuming 100% mass recovery. Number average molecular weight and polydispersity index are calculated and reported.

Soil Adsorption Test

A rectilinear 3.00 inch×4.00 inch piece of a handsheet prepared and treated as set forth below is cut, if necessary, using a 3 inch×4 inch die cutter to provide a sample portion having a basis weight of from 19 g/m² to 33 g/m² (sample portions outside this range are discarded). All specimens are obtained from a portion of the test material at least 0.5 inches from any edges. The handsheet is labeled with the specimen name using a ball-point pen or equivalent marker. After the handsheet has been conditioned in the conditioned room at 70° F.±2° F. and a relative humidity of 50%±2% for at least 2 hours (preferably overnight), the handsheet is weighed to within ±10 mg (Weight$_{substrate}$) while still maintaining the conditioning conditions. The remainder of the work is done in a laboratory at a temperature of 73° F.±3.5° F. and a relative humidity <70%. The handsheet is then placed on a lattice (23.75"×47.75") polystyrene light panel manufactured by Plaskolite, Inc., Columbus, Ohio, available from Home Depot as model #1425005A; or equivalent lattice). Each handsheet is then treated with a total of 3.8 mL (in 1-4 aliquots to avoid oversaturation if necessary) of the 0.02% polymer solution prepared as described above or if the polymer solution being tested is less than 0.02%, then the total amount of the polymer solution to be added to each handsheet (in 1-4 aliquots to avoid oversaturation if necessary) is determined by the following equation:

$$AmountAdded(mL) = \frac{3.8 \text{ mL} * 0.02\%}{PercentSolids(\%)}$$

The polymer solution is applied to the upper (treated) side of the handsheet only. At least 1.5 hours between aliquots is given to allow the handsheet to at least partially dry. After application of all the polymer solution, the handsheet are left to air dry for at least 4 hours on the lattice.

Once the handsheet is dry, the handsheet is folded in half with the treated side facing in so that the handsheet forms a 1.5"×4" testing strip. An accordion style (paper fan) folding technique is then used to fold the testing strip 5 times to produce a testing strip that contains 6 segments each about ⅔" in width.

A Petri dish (VWR sterile Petri dish, Simport plastics, 60 mm×15 mm, 28 mL volume, VWR Catalog #60872-306) is labeled with the handsheet name and weighed to within ±1 mg (Weight$_{dish}$).

A capped centrifuge tube containing a model soil and water prepared according to the Soil Solution Preparation set forth below is then agitated/shaken to disperse the model soil in the water to form a soil dispersion. The centrifuge tube is then uncapped permitting the testing strip to be fully immersed into the soil dispersion so that the folds of the testing strip run parallel to the length of the centrifuge tube. The centrifuge tube is then immediately re-capped and shaken in a WS 180° shaker for 60±1 seconds. The WS 180° shaker (Glas-Col #099AWS18012) is set at 50% speed so that it inverts the specimen 160-170° every 1 second.

After shaking, the testing strip is carefully removed over a Petri dish using laboratory tweezers. Care must be taken to ensure that all of the soil dispersion is kept either in the original centrifuge tube or corresponding Petri dish. The soil dispersion is wrung from the testing strip using a "wringing" motion and collected in the Petri dish (≥85% of the soil dispersion should be collected). Once the soil dispersion has been removed from the testing strip, the testing strip is discarded. The remaining soil dispersion is poured from the centrifuge tube into the Petri dish after swirling the mixture to re-disperse the model soil into the water, thereby ensuring that no model soil is inadvertently left behind in the centrifuge tube. The Petri dish containing the soil dispersion is weighed to within ±1 mg (Weight$_{Dish+Effluent}$). The Petri dish is then placed into a vented laboratory drying oven at 60° C. until the sample is dry, preferably overnight. Once the specimen is dry, the Petri dish is removed from the oven and allowed to cool to 73° F.±4° F. The Petri dish is then re-weighed to within ±1 mg (Weight$_{Dish+DriedSoil}$).

Soil Solution Preparation—A centrifuge tube (VWR brand 50 mL superclear ultra high performance freestanding centrifuge tube with flat cap, VWR Catalog #82018-052; or equivalent tube) is labeled with the specimen name and weighed to within ±1 mg (Weigh$_{Vial+Cap}$). Next 0.1784 g±0.0005 g of a model soil (Black Todd Clay available from Empirical Manufacturing Co., 7616 Reinhold Drive, Cincinnati, Ohio 45237-3208) is weighed (Weigh$_{Added\ Soil}$) and then placed into the centrifuge tube. Deionized water, 25.0 mL±0.2 mL, is added slowly to the centrifuge tube using a suitable dispenser. The deionized water is poured carefully into the centrifuge tube to avoid causing a plume of dust from the model soil. If a plume of dust occurs, the centrifuge tube is discarded and a new centrifuge tube is prepared. The centrifuge tube is then re-weighed to within ±1 mg (Weight$_{Vial+Cap+Dispersion}$).

Preparation of Handsheet—In order to test the soil adsorption properties of a material, such as a polymer, a handsheet is prepared as follows and is then used in the Soil Adsorption Test Method described above.

A handsheet is a handmade specimen of a fibrous structure. Handsheets are prepared at target basis weight of 26.8 g/m², but no less than 19 g/m² and no more than 33 g/m² using the following procedure.

a. Pulp Preparation—A pulp slurry of Northern Softwood Kraft (NSK) pulp is made as follows. Using an analytical balance capable of weighing to ±0.0002 g, weigh out 30 g of NSK dry lap (pulp). Record the weight of the NSK dry lap. Record the percent bone-dry pulp or consistency for this pulp. Put 500 mL of 23° C.±2° C. of City of Cincinnati, Ohio Water (or equivalent having the following properties: Total Hardness=155 mg/L as CaCO$_3$; Calcium content=33.2 mg/L; Magnesium content=17.5 mg/L; Phosphate content=0.0462) into a 2000 mL polypropylene beaker. Add the weighed NSK dry lap to the water in the beaker immediately following the addition of the water to the beaker. After the NSK dry lap is completely wetted (about 50-60 seconds), remove the wetted NSK dry lap and manually tear into small pieces of wetted NSK dry lap, approximately 2 cm² or less pieces. Add the small pieces of wetted NSK dry lap back into the water in the beaker. Let the wetted NSK dry lap soak in the water for at least 1 hour, typically 1-2 hours. At the end of the soaking period, transfer the contents of the beaker (water and pulp) to a disintegrator tank of a pulp disintegrator commercially available from Testing Machines, Inc. under the tradename 73-18 Pulp Disintegrator or its equivalent. Follow the manufacturer's instructions for maintaining, calibrating, and cleaning the disintegrator, as needed. The disintegrator must meet TAPPI Standard T-205. Using more of the City of Cincinnati, Ohio water (or equivalent water as described above) delivered by a polyethylene wash bottle, wash and remove any remaining pulp adhering to the beaker into the disintegrator tank. Additional City of Cincinnati, Ohio water (or equivalent water as described above) is added to the disintegrator tank to result in a total of 1500 mL of total volume in the disintegrator tank.

Next, place the disintegrator tank containing the pulp and City of Cincinnati, Ohio water (or equivalent water as described above) (23° C.±2° C.) on the distintegrator's platform and position it under the shaft and impeller blade of the disintegrator. Clamp the disintegrator tank firmly in place on the disintegrator's platform. Lower the impeller blade into position and lock in place according to the manufacturer's instructions. Put the disintegrator tank's lid in place on the disintegrator tank. Set an interval timer with timed switch outlet for exactly 10 minutes. Turn the disintegrator on and start the timer with the alarm on the timer turned on such that the alarm sounds and the disintegrator turns off automatically after exactly 10 minutes of operation. Turn the alarm off. Use the pulp slurry (pulp plus City of Cincinnati, Ohio water (or equivalent water as described above)) in the disintegrator within an hour after the completion of the 10 minutes of operation. Do not let the pulp slurry stand idle for more than an hour before using it to make the handsheets.

b. Proportioning of Pulp—After the pulp slurry is prepared in the disintegrator tank as described above, the pulp slurry is then proportioned in a proportioner, such as a Noble and Wood Handsheet Forming Machine or a proportioner and handsheet forming machine, which is commercially available from Adirondack Machine Corporation as follows.

To a proportioner having a 19-21 L stainless steel tank, City of Cincinnati, Ohio water (or equivalent water as described above) is added to fill the tank to about half full (about 9-10 L). The agitator of the proportioner is turned on and the speed of the agitator is adjusted to 23 rpm±2 rpm to provide good mixing once the pulp slurry is added. Good mixing can be determined by seeing that the pulp slurry is evenly mixing with the City of Cincinnati, Ohio water (or equivalent water as described above) that is added to the tank. Next, add the equivalent of 30 g of bone-dry pulp of the pulp slurry produced above to the tank. After addition of the pulp slurry to the tank, set the volume scale of the proportioner to the 19 L mark. Add additional City of Cincinnati, Ohio water (or equivalent water as described above) to make the liquid level approximately even with the top of the hook on the solution indicator pointer of the proportioner.

c. Forming Handsheet—A handsheet is made from the pulp slurry present in the proportioner, described above, as follows.

The handsheet is made using a 12"×12" stainless steel sheet mold commercially available from Adirondack Machine Corporation. First, open the drain valve on the deckle box of the sheet mold and completely drain the deckle box. The deckle box needs to be clean and free of contaminants. Close the drain valve and open the deckle box. Turn on the water supply, City of Cincinnati, Ohio water (or equivalent water as described above) and allow the deckle box to overflow. Place a clean forming wire (84M 14"×14" polyester monofilament plastic cloth, commercially available from Appleton Wire Co.), on the coarse deckle box wire so as not to entrap any air bubbles under the forming wire. If air bubbles persist, eliminate by rubbing the wire gently with hands before closing the deckle box. Air bubbles under the forming wire, if not removed, will cause holes in the handsheet and makes the handsheet unacceptable for use in the tests described herein.

After the forming wire has been thoroughly wetted by the water, close and lock the deckle box and allow the water to rise to 8½" from the forming wire in the deckle box. A mark on the inside of the deckle box should be used to permanently indicate this volume. Add 2543 mL of the pulp slurry from the proportioner to the water in the deckle box using the proportioner sample container. Using the perforated metal deckle box plunger, distribute the pulp slurry uniformly by moving the plunger from near the top of the pulp slurry to the bottom of the pulp slurry within the deckle box and back for three complete up and down cycles. Do not touch the forming wire on the downward strokes. After the third cycle, bring the plunger up and pause for two seconds holding the plunger plate just beneath the pulp slurry surface (to eliminate wave action) and then withdraw slowly. Make sure that the pulp slurry is undisturbed in the deckle box.

Depress the switch to activate the timed opening of the drop valve of the deckle box. The drop valve will close automatically after the deckle box is completely drained. Most units completely drain in about 20-25 seconds. After the drop valve closes, open the deckle box and carefully remove the forming wire with fiber mat side up from the deckle box. Immediately place the forming wire with fiber mat side up on a vacuum box's surface (a vacuum box table) having a surface at a vacuum slot (13"×1/16" 90° flare) over which the forming wire with fiber mat passes. Keep the edge of the forming wire which is next to the operator in the same relative position during this transfer from the deckle box to the vacuum box table.

The vacuum box table's vacuum valves are set such that the low level of vacuum (pre-vacuum) peaks at 4.0±0.5" Hg and the high level vacuum peaks at 10.0±0.5" Hg according to an Ashcroft Vacuum Gauge Model 1189, range 0-15" Hg commercially available from Ashcroft Inc.

Turn on the vacuum pump (a Nash H4 Pump with a draw of 106 cfm Motor-10 HP, 1745 rpm, 3 Ph, 60 Hz available from ECM Inc.) associated with the vacuum box table. Engage the low level vacuum (pre-vacuum). Position the forming wire with the fiber mat side up on the vacuum box table so that the front edge of the forming wire (edge next to the operator) extends over the vacuum slot about ¼"-½". Pull the forming wire with fiber mat across the vacuum slot in 1±0.3 seconds at a uniform rate. The vacuum gauge should peak at 4.0±0.5" Hg. This step is referred to as the Pre-vacuum Step.

Next, turn the low level vacuum and open the high level side of the vacuum system. Place the knubby side up of a transfer wire (44M 16"×14" polyester monofilament plastic cloth commercially available from Appleton Wire Co. with the knobby side, which is the sheet side, marked with an arrow indicating the machine direction) on the vacuum box table behind the vacuum slot. The transfer wire is placed on the vacuum box table such that the 16" length is perpendicular to the vacuum slot. Carefully turn the forming wire with the fiber mat over keeping the edge of the forming wire, which has been next to the operator, in the same relative position. Gently place the forming wire with fiber mat onto the center of the transfer wire, forming a "sandwich" so that the front edge of the transfer wire (edge next to the operator) extends over the vacuum slot about ¼"-½". The direction of travel of the fiber mat over the vacuum slot must be identical to the direction of travel of the forming wire with fiber mat during the Pre-vacuum Step described above. The "sandwich" is pulled across the vacuum slot in 1±0.3 seconds at a uniform rate. The vacuum gauge should peak at 10.0±0.5" Hg. This step, which transfers the fiber mat from the forming wire to the transfer wire, is called the Transfer Vacuum Step.

Close the high level vacuum and turn off the entire vacuum system. By this time the fiber mat has become a handsheet. Next, place the "sandwich" on the vacuum box table. Separate the forming wire from the handsheet and the transfer wire by gently lifting one corner of the forming wire and removing it, leaving the handsheet attached to the transfer wire. Keep the edge of the fabric next to the operator in the same relative position as the handsheet as it was during the Transfer Vacuum Step. Make an arrow with an indelible pencil (a water color pencil commercially available from Dick Blick Art Supplies) on a corner of the handsheet to indicate the direction of travel across the vacuum slot. This identifies the handsheet's machine direction.

Next, pass the transfer wire with the handsheet attached through an E-100 Drum Dryer commercially available from Adirondack Machine Corporation with the transfer wire next to the drum dryer and with the edge that was kept next to the operator going into the drum dryer last. Pass the transfer wire with the handsheet attached through the drum dryer a second time with the handsheet next to the drum dryer.

The handsheet is removed immediately after exiting the dryer drum the second time while it is still warm.

The handsheet formed must be at a target basis weight of 26.8 g/m², but no less than 19 g/m² and no more than 33 g/m² suitable for testing. If the basis weight is less than 19 g/m² or greater than 33 g/m² then either the amount of pulp is too small or too large and the process needs to be adjusted accordingly to produce a handsheet with a target basis weight of 26.8 g/m², but no less than 19 g/m² and no more than 33 g/m².

Calculations

To calculate the amount of residual model soil ($Mass_{Residual Soil}$) left in the Petri dish, the following equation is used:

$$Mass_{Residual Soil} = Weight_{Dish+DriedSoil} - Weight_{Dish}$$

Residual model soil is reported in mg.

To calculate the amount of soil adsorbed (Soil Retained) in the specimen, the following calculation is used:

$$Soil\ Retained = Weight_{AddedSoil} - Mass_{ResidualSoil}$$

The amount of soil adsorbed is reported in mg.

To calculate the percent of soil retained (% Soil Retained), the following calculation is used:

$$\%\ SoilRetained = \left[\frac{SoilRetained}{Weight_{AddedSoil}}\right] * 100\%$$

The test is performed on four replicates and the average amount of soil adsorbed (also known as the Soil Adsorption Value) and the average percent of soil retained (% Soil Retained$_{avg}$) are calculated for the material.

Charge Density Test Method

The charge density of a polymer, such as a soil adsorption polymer, can be determined by using a Mutek PCD-04 Particle Charge Detector available from BTG, or equivalent instrument. The following guidelines provided by BTG are used.

Start with a 0.1% solution (0.1 g polymer+99.9 g deionized water) (sample). Depending on the titrant consumption increase or decrease polymer content if needed. Solution pH is adjusted prior to final dilution as charge density of many polymers and/or additives is dependent upon solution pH. A pH of 4.5 is used here.

1. Place 20 mL of sample in the PCD measuring cell and insert piston.

2. Put the measuring cell with piston and sample in the PCD, the electrodes are facing the rear. Slide the cell along the guide until it touches the rear.

3. Pull piston upwards and turn it counter-clock-wise to lock the piston in place.

4. Switch on the motor. The streaming potential is shown on the touch panel. Wait 2 minutes until the signal is stable.

5. Use an oppositely charged titrant (for example for a cationic sample having a positive streaming potential: use an anionic titrant). Titrants are available from BTG consisting of 0.001N PVSK or 0.001N PolyDADMAC.

6. An automatic titrator available from BTG is utilized. After selecting the proper titrant, set the titrator to rinse the tubing by dispensing 10 mL insuring that all air bubbles have been purged.

7. Place tubing tip below the surface of the sample and start titration. The automatic titrator is set to stop automatically when the potential reaches 0 mV.

8. Record consumption of titrant, ideally, the consumption of titrant should be 0.2 mL to 10 mL; otherwise decrease or increase polymer content.

9. Repeat titration of a second 20 mL aliquot of the polymer sample.

10. Calculate charge demand (solution) or charge demand (solids);

$$Charge\ demand(eq/L) = \frac{V\ titrant\ used\ (L) \times Conc.\ of\ titrant\ in\ Normality\ (eq/L)}{Volume\ of\ sample\ titrated\ (L)}$$

$$Charge\ demand(eq/g) = \frac{V\ titrant\ used\ (L) \times Conc.\ of\ titrant\ in\ Normality\ (eq/L)}{Wt.\ solids\ of\ the\ sample\ or\ its\ active\ substance\ (g)}$$

The charge demand (charge density) of a polymer is reported in meq/g units.

Basis Weight Test Method

The rectilinear 3.00 inch×4.00 inch piece of specimen cut as above in the soil adsorption test method is conditioned in a conditioned room at 70° F.±2° F. and a relative humidity of 50%±2% for at least 2 hours, typically overnight. The specimen is weighed to within ±10 mg ($Weight_{substrate}$) while still maintaining the conditioning conditions. The Basis Weight of the specimen is then calculated as follows:

$$BasisWeight(gsm) = \left(\frac{Weight_{Substrate}(g)}{3\ inch \times 4\ inch}\right) * \left(\frac{inch}{2.54\ cm}\right)^2 * \left(\frac{100\ cm}{m}\right)^2$$

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A polymer solution comprising water and polymer comprising two or more monomeric units selected from the group consisting of:
   a. nonionic monomeric units;
   b. anionic monomeric units;
   c. cationic monomeric units;
   d. zwitterionic monomeric units; and
   e. mixtures thereof;
   wherein the polymer exhibits a Soil Adsorption Value of at least 38 mg as measured according to the Soil Adsorption Test Method and wherein the polymer comprises at least 69.9% wt of a monomeric unit from group a and wherein the polymer exhibits a charge density (at pH 4.5) of from about −0.1 meq/g to about +0.1 meq/g as measured according to the Charge Density Test Method.

2. The polymer solution according to claim 1 wherein the polymer exhibits a number average molecular weight of less than 2,000,000 g/mol.

3. The polymer solution according to claim 1 wherein the polymer exhibits a Soil Adsorption Value of at least 40 mg as measured according to the Soil Adsorption Value Test Method.

4. The polymer solution according to claim 1 wherein the nonionic monomeric units comprise a nonionic hydrophilic monomeric unit.

5. The polymer solution according to claim 1 wherein the nonionic monomeric units comprise a nonionic hydrophobic monomeric unit.

6. The polymer solution according to claim 1 wherein the anionic monomeric units are derived from anionic monomers selected from the group consisting of: monomers having at least one carboxylic function, monomers that are precursors of carboxylate functions, monomers having at least one sulfate or sulfonate function, monomers having at least one phosphonate or phosphate function, esters of ethylenically unsaturated phosphates, and mixtures thereof.

7. The polymer solution according to claim 1 wherein the anionic monomeric unit is derived from anionic monomers selected from the group consisting of: acrylic acid, methacrylic acid, 2-acrylamido-2-methylpropane sulfonic acid, carboxyethyl acrylate, and mixtures thereof.

8. The polymer solution according to claim 1 wherein the cationic monomeric units are derived from cationic monomers selected from the group consisting of: acryloyl- or acryloyloxyammonium monomers, 1-ethyl-2-vinylpyridinium or 1-ethyl-4-vinylpyridinium bromide, chloride or methyl sulfate, N,N-dialkyldiallylamine monomers, polyquaternary monomers, N,N-(dialkylamino-w-ω-alkyl)amides of $\alpha,\beta$-monoethylenically unsaturated carboxylic acids, $\alpha,\beta$-monoethylenically unsaturated amino esters, vinylpyridines, vinylamine, vinylimidazolines, monomers that are precursors of amine functions which give rise to primary amine functions by simple acid or base hydrolysis, and mixtures thereof.

9. The polymer solution according to claim 1 wherein the cationic monomeric unit is derived from (3-methacrylamidopropyl)trimethylammonium chloride.

10. The polymer solution according to claim 1 wherein the polymer comprises no more than 30.1% wt of a monomeric unit selected from the group consisting of: group b, group c, and mixtures thereof.

11. The polymer solution according to claim 1 wherein the polymer comprises a monomeric unit from group a and a monomeric unit from group c.

12. The polymer solution according to claim 11 wherein the polymer comprises an acrylamide-derived monomeric unit and a quaternary ammonium-derived monomeric unit.

13. The polymer solution according to claim 1 wherein the polymer comprises a monomeric unit from group b and a monomeric unit from group c.

14. The polymer solution according to claim 1 wherein the polymer comprises a monomeric unit from group a, a monomeric unit from group b, and a monomeric unit from group c.

15. The polymer solution according to claim 1 wherein the polymer comprises a monomeric unit from group a, a monomeric unit from group b, and a monomeric unit from group d.

16. The polymer solution according to claim 1 wherein the polymer comprises a monomeric unit from group a, a monomeric unit from group c, and a monomeric unit from group d.

17. The polymer solution according to claim 1 wherein the polymer comprises a monomeric unit from group b, a monomeric unit from group c, and a monomeric unit from group d.

18. The polymer solution according to claim 1 wherein the polymer exhibits a Polydispersity Index of less than 2.5.

* * * * *